United States Patent

Nye et al.

[11] Patent Number: 6,120,650
[45] Date of Patent: Sep. 19, 2000

[54] SEPARATION OF HYDROCARBONS/WATER/ EMULSIFIER MIXTURES

[75] Inventors: James O. Nye, Friendswood; Robin M. Pate, Houston, both of Tex.

[73] Assignee: Onsite Technology LLC, Houston, Tex.

[21] Appl. No.: 09/015,948

[22] Filed: Jan. 28, 1998

Related U.S. Application Data

[62] Division of application No. 08/719,681, Sep. 26, 1996, Pat. No. 5,736,031.

[51] Int. Cl.[7] .................................. C10G 7/00; B01D 5/00
[52] U.S. Cl. .......................... 196/116; 96/181; 196/46.1; 196/110; 196/138; 196/140; 202/202; 202/204
[58] Field of Search .................................. 196/138, 46.1, 196/116, 103, 110, 140; 208/480, 340; 202/186, 182, 188.2, 202, 204, 211, 185.1; 203/14, 68; 96/181; 432/113

[56] References Cited

U.S. PATENT DOCUMENTS

| | | | |
|---|---|---|---|
| 3,674,890 | 7/1972 | Oleszko et al. | 208/48 |
| 3,948,622 | 4/1976 | Tsao | 55/32 |
| 4,137,135 | 1/1979 | Glassman et al. | 203/87 |
| 4,225,415 | 9/1980 | Mirza et al. | 208/340 |
| 4,340,444 | 7/1982 | Roma | 202/99 |
| 4,434,028 | 2/1984 | Eppig et al. | 196/14.52 |
| 4,623,447 | 11/1986 | Clampitt et al. | 208/187 |
| 4,872,949 | 10/1989 | Wilwerding | 202/202 |
| 5,152,233 | 10/1992 | Spisak | 110/240 |
| 5,199,354 | 4/1993 | Wood | 110/241 |
| 5,302,118 | 4/1994 | Renegar et al. | 432/14 |
| 5,378,059 | 1/1995 | Brock | 366/7 |
| 5,499,586 | 3/1996 | Davis | 110/246 |
| 5,570,749 | 11/1996 | Reed | 175/66 |
| 5,736,031 | 4/1998 | Nye et al. | 208/340 |
| 5,837,037 | 11/1998 | Winter | 95/172 |
| 5,927,970 | 7/1999 | Pate et al. | 432/115 |

OTHER PUBLICATIONS

"Elements of Thermally Treating Oil–Base Mud Cuttings" G.A. Young, F.B. Growcock, and K.J. Talbot, SPE/IADC 21939 1991 Drilling Conference, Amesterdam, Mar. 11–14, 1991.

*Primary Examiner*—Virginia Manoharan
*Attorney, Agent, or Firm*—Kenneth H Johnson

[57] ABSTRACT

An apparatus for separating vaporous mixtures of hydrocarbons, water and emulsifier derived from the remediation of wellbore fluid, such as a mud containing solid particulate material in which the vaporous mixture is quenched with a hydrocarbon stream which is at a temperature above the boiling point of water and below the boiling point of the hydrocarbons in the vaporous stream. Most of the hydrocarbons in the vaporous stream and substantially all of the emulsifier are condensed into the hydrocarbon quench to form an oil stream. The water is recovered from the hydrocarbon quench as a vaporous stream and quenched with water. The quenched water and any residual heavier hydrocarbons are separated by phase separation.

6 Claims, 1 Drawing Sheet

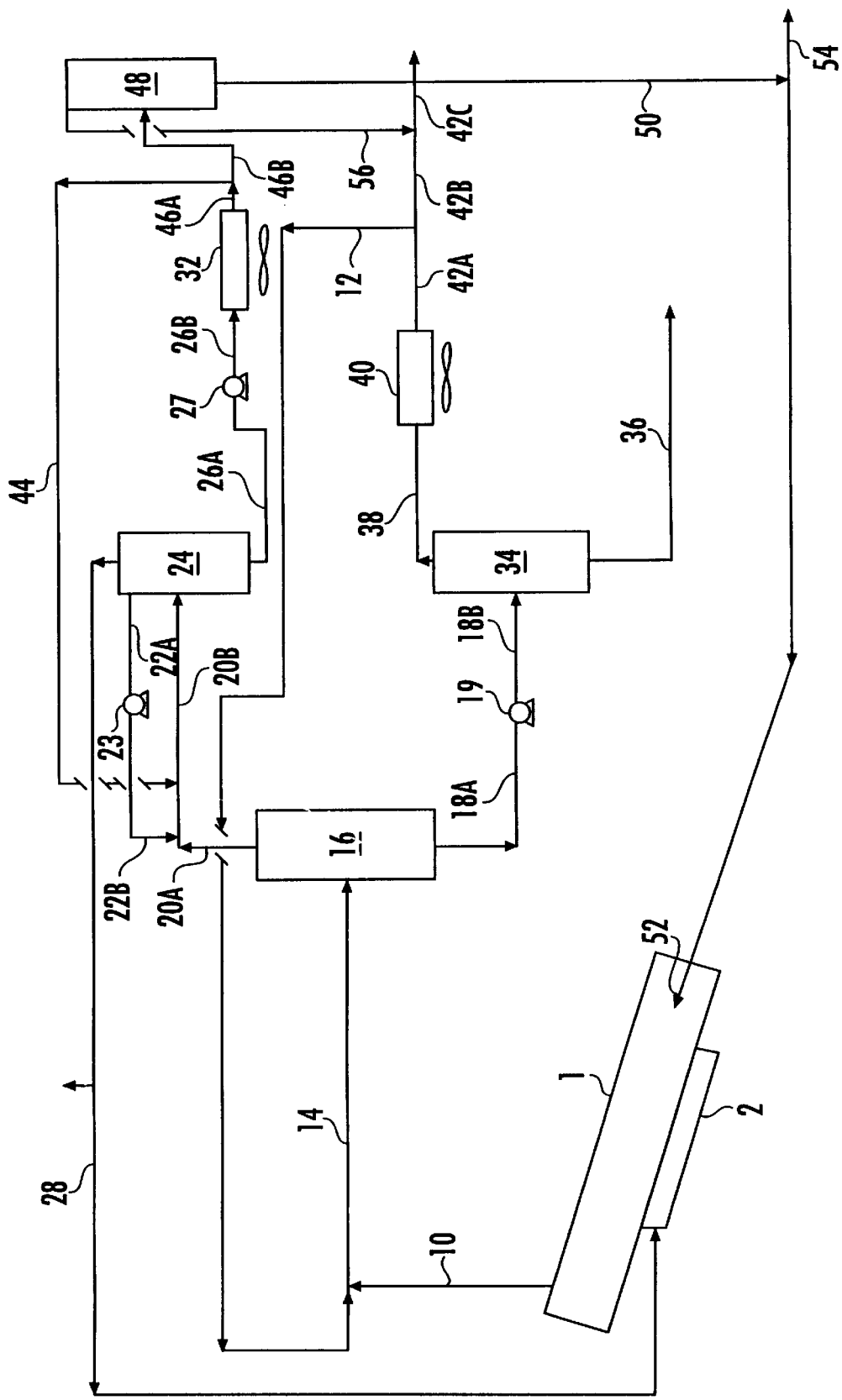

SEPARATION OF HYDROCARBONS/WATER/EMULSIFIER MIXTURES

This application is a divison of U.S. Ser. No. 08/719,681 filed Sep. 26, 1996, now U.S. Pat. No. 5,736,031.

BACKGROUND OF THE INVENTION

1. Field of the Invention

The present invention relates to apparatus and a method of separating hydrocarbons from mixtures with water, in particular hydrocarbon/water/emulsifier mixtures recovered from wellbore fluids in remediation processes.

2. Related Information

Due to environmental concerns the removal of volatile material from solids has become an important process. For example, volatile materials must be removed from solids in the reclamation of petroleum lubricated drilling fluids used in the exploration and production of petroleum oils. The drilling fluid, referred to as "mud", serves several purposes, the most important of which includes cooling and lubricating the bit and removing drilled solids, or cuttings, from the borehole. While most mud is a water based, flowable composition, the drilling mud is frequently compounded with a lubricant material such as diesel, crude oil or other non-water petroleum based constituent and various surfactants or emulsifiers to create stable emulsions of the water and hydrocarbon to facilitate the mud's lubricating characteristics.

The mud may be contained in a mud tank, which is connected by way of a mud line and mud pump to a hose and swivel used to inject the mud into the top of the drill pipe. The returning mud, combined with the cuttings, is captured in a mud return pipe and recirculated through the drill pipe.

When the concentration of the drill cuttings in the mud rises too high recirculation of the mud becomes a problem. In order for the mud to perform its several functions, its viscosity, density and other properties must be maintained within acceptable limits. The drill cuttings adversely affect these properties thus reducing the carrying capacity of the mud and damaging the drilling equipment.

To allow for effective recirculation, the mud is usually separated from the cuttings prior to being recycled through the drill string. The cuttings are then disposed of as waste which presents a problem when the lubricating properties of the mud have been enhanced by the addition of hydrocarbons. Because of the hydrocarbons in the cuttings a hazardous waste problem is presented. Historically, the contaminated cuttings were diluted by mixing and hauled to remote sites for disposal in landfills. This, however, also presents a problem in that the landfill then becomes a "hazardous" waste site leaving the dumper liable for environmental damages indefinitely.

Decontaminating the cuttings is more attractive. Treatment processes heretofore available to remove oil or other hydrocarbons from cuttings include distillation, solvent washing, and mud burning. While these processes are effective to varying degrees at stripping the hydrocarbon contaminants from cuttings, rendering the cuttings environmentally clean, they remain problematic in that disposal persists with the liquid or vapor from the disassociated contaminant.

There are several patents on rotary kilns specifically designed to remove volatile hydrocarbons from solid material such as soil. See for example U.S. Pat. Nos. 5,152,233; 5,199,354; 5,302,118; and 5,378,059. All of the rotary kilns are gas fired with the hot combustion gases being directed into the drum to heat the solids. When the solids have a substantial quantity of hydrocarbonaceous material an explosion hazard may be present. In addition, when the flame is applied directly to the contaminated materials, the solids are burned so that the contaminants are consumed and turned into smoke which may be an environmental hazard.

In order to achieve remediation, it has been determined that the hydrocarbons and water extracted with the cuttings from the wellbore fluid must be separated to recycle the materials or recover them for other disposition. One would normally expect that phase separation of the water and oil would be easily accomplished. However, when hydrocarbons such as diesel are incorporated in the water, surfactants or other emulsifiers must be added to obtain stable emulsion of the water/oil mixtures during use in the wellbore. These emulsifiers are volatilized out of the kiln along with the water and hydrocarbons, resulting in a recovered material, which when condensed is again a stable emulsion of water and oil.

One feature of this invention is to provide an apparatus to receive volatile contaminants from solids to recover and/or recycle the disassociated hydrocarbons. It is a particular feature that the present invention provides a process to separate water from hydrocarbons without the formation of stable emulsions thereof.

SUMMARY OF THE INVENTION

The invention concerns a process for obtaining separation of a mixed vaporous stream comprising hydrocarbons, water and emulsifier comprising:

contacting a first vaporous stream comprising hydrocarbons, water and emulsifier with a quench hydrocarbon stream, said quench hydrocarbon stream being at a temperature above the boiling point of water and below the boiling point of the hydrocarbon in said first vaporous stream, to condense a major portion of the hydrocarbon in said first vaporous stream and substantially all of said emulsifier to form an oil stream;

recovering a second vaporous stream comprising substantially all of the water as vapor;

condensing said water vapor and a minor portion of the hydrocarbons in said second vaporous stream and separating said condensed water and hydrocarbons by phase separation.

Optimizing the process conditions can result in recovering over 98% of the hydrocarbon (organic compounds) in the vapor from the kiln.

A suitable quench hydrocarbon would include hydrocarbons such as diesel fuel which may correspond to the hydrocarbons in the wellbore fluid, however, any hydrocarbon which is a flowable liquid under the conditions of the process may be used.

It should be appreciated that the present apparatus and process are useful for any soil type remediation, especially where the water and hydrocarbons (including modified hydrocarbons which may include other molecules than hydrogen and carbon, such as oxygen, sulfur, nitrogen, metals and the like), i.e. organic compounds, are volatilized under the conditions of the kiln.

The term emulsifier is used to include any compound organic or inorganic that would tend to make stable emulsions of water and oil, e.g., anionic and non ionic surfactants.

BRIEF DESCRIPTION OF THE DRAWING

The FIGURE is a simplified schematic representation of a preferred embodiment of the apparatus of the present invention for carrying out the process of the present invention.

DETAILED DESCRIPTION

A preferred kiln is essentially a unit which is a trailer mounted rotating drum through which contaminated soil, such as drilling cuttings, is heated and processed to remove and reclaim the contaminants. The contaminant is typically diesel oil which has been added to drilling muds. The soil which exits the unit is essentially contaminant free, and the diesel oil which has been vaporized during the heating process is condensed and collected.

The contaminated soil enters the unit through a hopper and is then propelled by means of an auger into the heated, rotating drum. Heat is applied to the outside of the rotating drum by means of two gas burners mounted on the bottom of the trailer. The flames, therefore, do not come in direct contact with the soil, with the heat being applied to the soil indirectly by conduction through the drum wall. For this process the soil temperatures must be in the 500–900° F. range.

The burners are mounted in separate fireboxes aligned in tandem with the drum axis and are located far enough from the drum so that the flame does not impinge upon the drum. The drum is heated by radiation from the burner flames as well as from convection of air heated by the burner flames. Rotation of the drum prevents the burners from locally overheating the drum.

A stationary shroud, or heat jacket, encompasses the rotating drum and burners. Soil transit through the drum is regulated by drum rotation and inclination and feed rate. The drum is tilted slightly toward the exit end by lowering that end of the trailer.

Decontaminated soil exits the lower end of the drum through a double door arrangement which reduces dust from exiting and prevents air from entering the drum. A dust shroud encloses the double door exit end of the drum.

The oil vapors inside the drum are drawn out by applying a slight vacuum to the feed end of the drum. The withdrawn vapors are then sent to a condensing unit and collected. A more detailed description of the kiln is presented in U.S. patent application Ser. No. 08/796,086 filed Feb. 5, 1997, now U.S. Pat. No. 5,927,970 which is incorporated herein in its entirety.

In the FIGURE, line 10 carries kiln vapors comprising hydrocarbons, water, emulsifier and other volatile constituents from kiln 1. Line 12 carries cool oil quench which is sprayed into transfer line 14 carrying the kiln vapors to cool the kiln vapors and condense the major portion of the hydrocarbons. The condensed vapors are collected in primary separator 16 where the liquid hydrocarbon is separated via line 18*a* from water vapor and light hydrocarbons, such as methane and non-condensibles such as CO and $CO_2$ which exit the separator via line 20*a*.

In this first separation, not only are most of the hydrocarbons and water separated but the surfactants and emulsifiers which were added to the wellbore fluid are stripped into the liquid hydrocarbon fraction. Thus, the small amount of hydrocarbons remaining in the vaporous water phase is easily separated by phase separation since there is substantially none of the surfactant or emulsifier carried out in the vapor phase from primary separator 16.

The hydrocarbon (oil phase) recovered via line 18*a* is sent to filter 34 through pump 19 and line 18*b*. The filter may be, for example, an oil cyclone where dirty oil blowdown is collected via line 36 and recycled to the auger feed (not shown) to kiln 1 or otherwise disposed of.

The clean oil recovered via line 38 is cooled by an air cooled heat exchanger 40 exiting through line 42*a*. A portion may be sent to storage via line 42*b* and a portion sent through line 12 to quench the kiln vapors in line 14.

Cool water is sprayed from line 22*b* into transfer line 20 to condense out most of the water and some higher hydrocarbons, which is collected by secondary separator 24 where the condensed water and some hydrocarbons are recovered via line 26*a*. The non-condensibles, depending on the composition and the relevant environmental considerations, are recovered via line 28 and may be used as auxiliary fuel for the kiln burners 2.

The condensed material (mainly water) leaves secondary separator 24 via line 26*a* and is pumped by pump 27 through line 26*b* to air cooled heat exchanger 32 hence into line 46*a*. A portion of the material in line 46*a* is returned via line 44 to transfer line 20*a* to aid in cooling the vaporous feed from the primary separator 16. Also in this embodiment cooled material from secondary separator 24 via line 22*a*, pump 23 and line 22*b* is used to cool the incoming vapors in line 20*a*.

A portion of cooled condensed material from heat exchanger 32 is also sent to oil/water phase separator 48 via 46*a* where water is recovered from the bottom of separator 48 via line 50 and may be used as dust suppressor spray 52 in the kiln or kiln product (not shown) or recovered for disposal via line 54.

The hydrocarbon phase from separator 48 is recovered and sent to storage via 56 and 42*c*.

In the schematic FIGURE many of the pumps, valves, pressure regulators and other items of conventional equipment are omitted, however their use and placement are readily apparent to those of ordinary skill.

In the TABLE data for a typical operation of a vapor recovery unit operating in accordance with the preferred embodiment is presented.

TABLE

| STREAM NO. | 14 | 20a | 18a | 18b | 42a | 42b | 12 | 20b | 22a |
|---|---|---|---|---|---|---|---|---|---|
| TEMP. °F. | 249 | 249 | 249 | 249 | 125 | 125 | 125 | 148 | 148 |
| PRESS. PSIA | 14 | 14 | 14 | 90 | 75 | 75 | 75 | 13 | 13 |
| FLOW, #/HR | 15,372 | 2,035 | 13,337 | 13,337 | 13,337 | 1,337 | 12,000 | 52,035 | 358 |

| STREAM NO. | 26a | 26b | 46a | 22b | 44 | 46b | 56 | 54 | 42c | 50 |
|---|---|---|---|---|---|---|---|---|---|---|
| TEMP. °F. | 148 | 148 | 115 | 203 | 115 | 115 | 115 | 115 | 123 | 115 |
| PRESS. PSIA | 13 | 90 | 75 | 17 | 75 | 75 | 75 | 75 | 75 | 75 |
| FLOW, #/HR | 51,667 | 51,667 | 51,667 | 358 | 50,000 | 1,677 | 242 | 435 | 1,579 | 1,000 |

The invention claimed is:

1. An apparatus for recovering and separating a mixed vaporous stream comprising hydrocarbons, water and emulsifier comprising:

a first contact line in which a vaporous mixture of hydrocarbons, water and emulsifier is contacted with a liquid hydrocarbon to condense a portion of said vaporous hydrocarbons and emulsifier, a first vessel connected to said first contact line to collect said condensed hydrocarbons and emulsifier, and separate vaporous water therefrom, a first cooler connected to said first vessel to cool said condensed hydrocarbons and emulsifier from said first vessel, a filter positioned between said first vessel and said first cooler, said first cooler being connected to said first contact line to return a portion of said condensed hydrocarbons and emulsifier to said first contact line, a second contact line to receive vaporous water from said first vessel and to contact said vaporous water with liquid water to condense said vaporous water, a second vessel connected to said second contact line to collect said condensed water and remove non-condensibles, a second cooler connected to said second vessel to cool said condensed water, said second cooler being connected to said second contact line to return a portion of said condensed water to said second contact line and a kiln having a vapor collecting zone connected to said first contact line.

2. An apparatus for recovering and separating a mixed vaporous stream comprising hydrocarbons, water and emulsifier comprising:

a first line for carrying a vaporous mixture of hydrocarbons, water and emulsifier connected to, a second line for carrying a liquid hydrocarbon for in line contact with said vaporous mixture of hydrocarbons, water and emulsifier from said first line and for in line condensation of a portion of said vaporous hydrocarbons and emulsifier, a first vessel connected to said second line to collect said condensed hydrocarbons and emulsifier and separate vaporous water therefrom, a first cooler connected to said first vessel to cool said condensed hydrocarbons and emulsifier from said first vessel, a filter positioned between said first vessel and said first cooler, said second line connecting to said first cooler to return a portion of said condensed hydrocarbons and emulsifier for said contact with the vaporous stream from said first line, a third line for carrying vaporous water from said first vessel connected to, a fourth line for carrying liquid water for in line contact of said vaporous water with liquid water to condense said vaporous water, a second vessel connected for collecting said condensed water and removing non-condensibles, a second cooler connected to said second vessel to cool said condensed water, said fourth line connecting to said second cooler to return a portion of said condensed water for said contact with said vaporous water and a vapor collecting zone connected to said first line.

3. The apparatus according to claim 2 wherein filtered material removed from said condensed hydrocarbons and emulsifier is returned to said kiln.

4. The apparatus according to claim 2 wherein a portion of cooled condensed material from second cooler is sent to a phase separator.

5. The apparatus according to claim 4 wherein a line from said phase separator is connected to a kiln having said vapor collecting zone for returning water from said phase separator to said kiln.

6. The apparatus according to claim 2 wherein a line is provided to recover a portion of said condensed hydrocarbons and emulsifier from said first cooler.

* * * * *